_United States Patent Office_ 3,839,578
Patented Oct. 1, 1974

3,839,578
2-(3-BENZO(B) THENYL) - 2 - THIOPSEUDOUREA AND ITS PHARMACEUTICALLY ACCEPTABLE SALTS, COMPOSITIONS THEREOF AND METHODS FOR USING SAME
Zaven S. Ariyan, Woodbury, Conn. 06798, and Shih-Yu Ma, Cheshire, Conn. 06410
No Drawing. Original application Apr. 6, 1972, Ser. No. 241,837. Divided and this application June 1, 1973, Ser. No. 365,873
Int. Cl. A61k 27/00
U.S. Cl. 424—275                18 Claims

ABSTRACT OF THE DISCLOSURE 2-(3-benzo(6)thenyl)-2-thiopseudourea and salts thereof in treating aggressive behavior.

FIELD OF THE INVENTION

The neurochemistry of aggression has recently attracted much attention, and it has long been recognized that aggressive behavior in animals and man can be produced by alterations in ordered brain function. In man, aggressive behavior is often associated with every type of mental disease. Thus, aggression is a major side effect of most mental disorders.

This is a division of application Ser. No. 241,837, filed Apr. 6, 1972.

This invention relates to 2-(3-benzo[b]thenyl)-2-thiopseudourea

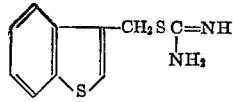

and its pharmaceutically acceptable salts—novel compounds which have been found to be highly selective for the abolition of aggressive behavior at doses which cause little or no signs or symptoms of central nervous system depression or toxicity. The pharmaceutically acceptable salts which have been tested, all of which appeared to have the activity mentioned above, include the chloride, bromide, benzoate, iodide, p-toluenesulfinate, p-toluenesulfonate and acetate. It is thought that, when taken orally, the salts may be buffered and the hydroxide or free base formed. On the other hand, the acid pH of the stomach (around 2 in humans) due to the presence of HCl is believed to cause reversion to the chloride, S-3-benzo[b]thenylisothiuronium chloride,

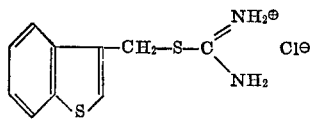

Therefore, much of the discussion of the invention hereinafter will be with reference to the chloride. However, it will be understood that the invention also encompasses the free base and other pharmaceutically acceptable salts thereof. In addition to the salts mentioned above, other suitable salts include the sulfate, nitrate, phosphate, maleate, fumarate, succinate, tartrate and citrate. Thus, while not wishing to be bound to any theory of how the compounds of the invention act _in vivo_, it is also believed possible that the base is the pharmaceutically active compound that is formed from the salts in animal tissue fluid.

It is well accepted in neuropharmacology that there is no clear distinction between sedative-hypnotics and minor tranquilizers. All known minor tranquilizers which are effective in reducing anxiety also produce drowsiness, ataxia (inability to coordinate muscular movements) and sleep when given in larger doses. All sedative-hypnotic drugs in small doses are "anxiolytic" (causing apprehension or anxiety). Sedative hypnotics such as alcohol and short-acting barbiturates tend to produce behavioral excitation prior to promoting drowsiness and sleep. The sedative hypnotics and minor tranquilizers produce discrete, predictable changes of behavior that can be applied to therapeutic advantages in neurotics. Aside from their ability to promote sleep, their major behavioral actions of therapeutic advantage are their abilities to slightly reduce the level of arousal-excitability, overcome passive avoidance (social withdrawal, suppressed or submissive) behavior, slightly diminish aggressive hostility, and increase the response to environmental stimuli. The effect, for example, of a "psychomimetic" (inducing psychosis-like symptoms) drug on animal behavior, such as LSD in rats and cats, has been said to increase "excitement" and "aggression."

Currently, aggressive behavior in mental disease patients is usually controlled by such major tranquilizers as chlorpromazine. This approach to the problem of controlling mental disorders is not entirely satisfactory since patients under the influence of this type of medication are overtly depressed and not able to return satisfactorily to society and to function normally. Chlorpromazine is a strong central nervous system depressant, both in normal and schizophrenic patients. Its most salient feature, however, is the ability to inhibit aggressive behavior in abusive and destructive schizophrenics. It has been the drug of choice for the treatment of so-called "backward" schizoprenics, and is now used in out-patient therapy in cases of simple schizophrenia. The compound has many side-effects, the most serious of which is that it causes depression at the same time that it alleviates the schizophrenic symptoms. Incidentally, it also has a disadvantage in that it is quite toxic and has caused liver damage and blood disorders.

The abolition of aggressive behavior in schizophrenics without neurotoxicity as characterized by depression would be a most desirable feature for a new drug in the therapy of mental disease. The compounds of the present invention have been found to be agents which selectively block aggressive behavior but do not cause depression.

Accordingly, in one respect, the invention is a method of treating aggressive behavior. In another aspect, the invention is the compound 2-(3-benzo[b]thenyl) - 2 - thiopseudourea and its pharmaceutically acceptable salts, and pharmaceutical compositions comprising these compounds. A particularly preferred compound of the present invention is S-3-benzo[b]thenylisothiuronium chloride.

The patent literature discloses many biologically active benzo[b]thiophene compounds but does not disclose the particular compounds of the present invention nor suggest the herein disclosed properties thereof. For example, U.S. Pat. No. 2,916,495 to Edgerton discloses a class of betathianaphthenylalkyl hydrazines as having advantageous hypotensive activity and the like; U.S. Pat. No. 3,010,971 teaches that certain 2-(benzo-[b]-thenyl) cyclopropylamine derivatives have the ability to act as antidepressive, ataractic and hypotensive agents; British Patents Nos. 855,115 and 1,174,411 and U.S. Pat. 3,070,606 disclose a number of benzo[b]thiophene derivatives as having several pharmaceutical applications; and German Patent Publication No. 1,937,514 (Feb. 19, 1970) discloses benzo[b]thiophenecarboxamides as being effective on the central nervous system, for example as having antiemetic action against morphine or apomorphine. Moreover, U.S. Pat. No. 3,186,990 contains a generic disclosure which encompasses S-2-benzo[b]thenyl isothiuronium chloride, the 2-isomer of the chloride compound of the present invention, and teaches that the class of compounds to which it relates are useful as fungicides. A similar disclosure is present in British Pat. No. 889,002.

In French Pat. 2,068,420, issued Aug. 27, 1971, 1-(benzo-[b]-3-thienyl-methyl) guanidine,

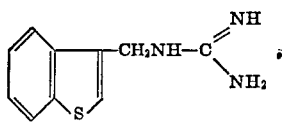

and its pharmaceutically acceptable salts, compounds which are structurally closely related to those of the present invention, are disclosed as being useful in the treatment of hypertension (high arterial blood pressure), hyperthyreosis (excessive functional activity of the thyroid gland) and tachycardia (relatively rapid heart action). It will be noted that the compounds of the French patent differ from those of the present invention by having an —NH— radical substituted for an —S— radical between the —CH₂ and the

on the side chain. However, as is known, particularly in the pharmaceutical field, this difference is more than enough to result in unanticipatable differences in properties. Indeed, such differences exist in the present case. Thus, although both groups of compounds are pharmaceuticals, their utilities are in markedly different and substantially unrelated pharmaceutical applications.

In addition, two U.S. Pats. Nos. 3,033,875 and 3,041,351, which relate to flavoring agents, contain identical descriptions of the preparation of 3-thionaphthylmethyl mercaptan. (Examples 3 and 2 of these patents, respectively.) As will become apparent from the description hereinafter of the preparation of the chloride compound of the present invention, the synthesis described in these two patents, more particularly at column 2, lines 1–18 of U.S. Pat. No. 3,041,351 and column 3, lines 35–43 of U.S. Pat. 3,033,875, follows a procedure similar to that described herein. However, the patentees reacted the resulting intermediate with NaOH; and they neither appreciated, identified nor isolated the intermediate. Moreover, they teach a procedure whereby the intermediate is destroyed by treatment with aqueous sodium hydroxide.

The present invention provides a method of controlling aggressive behavior in an animal subject without causing the central nervous system depression which is a typical side effect of drugs heretofore used to treat aggressive behavior. This is achieved by administering to an animal subject a therapeutically effective amount of a compound selected from the group consisting of 2-(3-benzo[b]thenyl)-2-thiopseudourea and its pharmaceutically acceptable salts, preferably S-3-benzo[b]thenyl isothiuronium chloride. Generally, the amount administered will be from about 1 to 50 mg./kg./day of body weight, preferably from about 2 to 8 mg./kg./day.

The invention further provides as new compositions of matter, 2-(3-benzo[b]thenyl)-2-thiopseudourea

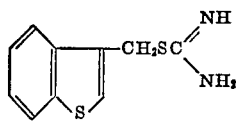

and its pharmaceutically acceptable salts, which are effective as psychotherapeutic agents, more particularly as anti-aggression drugs, as well as pharmaceutical compositions comprising these compounds.

The salts of the present invention may be represented by the formula

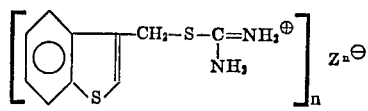

wherein Z is an anion derived from an acid which is pharmaceutically acceptable and whose pK value is between 0.4 and 6.5 and $n$ is an integer from 1 to 3 equal to the charge on the anion. As indicated, the chloride (Z is Cl⁻ and $n$ is 1) is a particularly preferred salt.

The pharmaceutical compositions of the present invention comprise, in combination, a therapeutically effective amount of a compound of the present invention and a pharmaceutically acceptable carrier or diluent therefor.

For example, in the case of a tablet, the composition will comprise, in addition to the active ingredient, fillers, binders and diluents such as lactose, methylcellulose, talc, gum tragacanth, gum acacia, agar, polyvinylpyrrolidone, stearic acid and/or corn starch. In the case of a liquid suspension for oral administration, the composition will comprise, in addition to the active ingredients, a filler such as sodium carboxymethylcellulose and/or a syrup, e.g. a glycerine based syrup. In the case of a parenteral solution or suspension, the composition will comprise, in addition to the active ingredient, a suitabale liquid solvent or dispersant such as a saline solution.

DESCRIPTION OF THE PREFERRED EMBODIMENTS

The compounds of the present invention may be obtained by conventional methods. Thus, S-3-benzo[b]thenyl isothiuronium chloride (A), is obtained from the reaction of 3-chloromethyl-benzo[b]thiophene (C) with an excess of thiourea in a water-free organic solvent which is a solvent for thiourea. Absolute ethanol is the preferred solvent. Other suitable solvents include dioxane, acetonitrile and dimethyldiethylene glycol (Isothiuronium chlorides, in general, hydrolyze easily in aqueous solution).

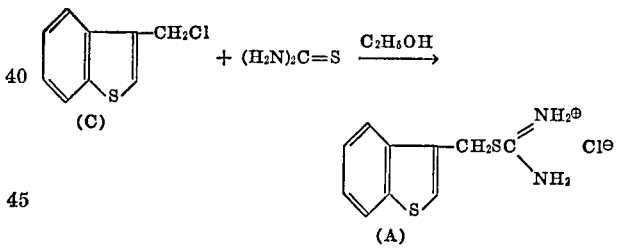

The starting reactant (C) was obtained from the chloromethylation of benzo[b]thiophene. The other salts are obtained analogously. The free base, 2-(3-benzo[b]thenyl)-2-thiopseudourea was obtained from the chloride by treatment with an aqueous sodium bicarbonate solution as follows:

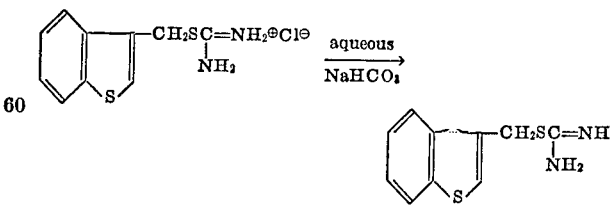

The 2-isomer (B) of the chloride compound of the present invention was found to have none of the anti-aggression activity shown by the compounds of the present invention. The structure of the chloride compound of the present invention is distinguished from its 2-isomer (B) on the basis of chemical evidence and physical data.

Chemically, the compounds are distinguished as follows. The hydrolysis of S-3-benzo[b]thenyl isothiuronium chloride (A) yielded 3-benzo[b]thenyl mercaptan (D), which was characterized by N.M.R. (Nuclear Magnetic Resonance) spectroscopic analysis (See Example 3, Table II).

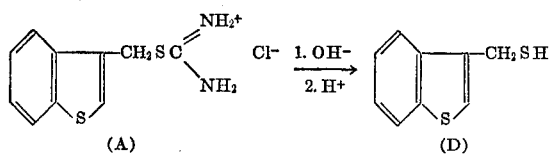
(A) (D)

The hydrolysis of S-2-benzo[b]thenyl isothiuronium chloride (B) yielded 2-benzo[b]thenyl mercaptan (E), along with a small amount of 2-benzo[b]thenyl disulfide (F).

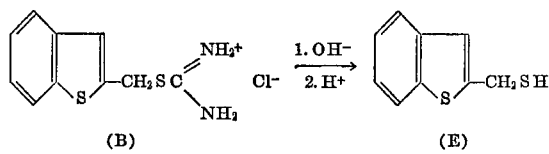
(B) (E)

The disulfide (F) is believed to be the product of the autoxidation of the mercaptan (E).

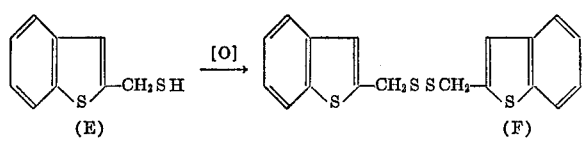
(E) (F)

The 2- and 3-isomers were also distinguished by the following physical data.

(1) S-3-benzo[b]thenyl isothiuronium chloride (A) has a melting point of 222–224° C.

(2) S-2-benzo[b]thenyl isothiuronium chloride (B) has a melting point of 194–6° C.

(3) The melting point of a mixture of (A) and (B) was 165–191° C.

(4) The N.M.R. spectral characteristics indicate existence of different structures (A) and (B). (See Tables I and II).

A sample of the 2-isomer (B) was prepared unequivocally via the following synthetic scheme proceeding through the known intermediates (G), (H), and (J).

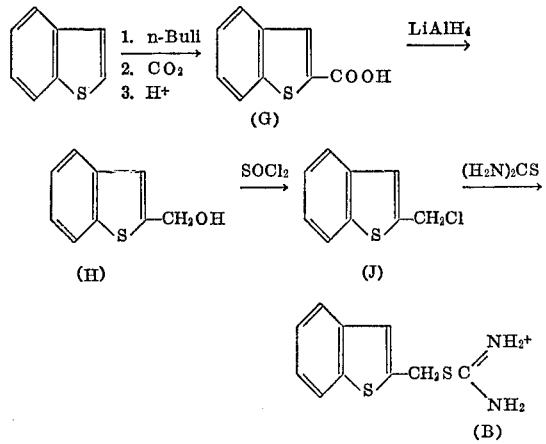

EXAMPLE 1

A. Preparation of 3-chloromethylbenzo[b]thiophene

A modifiction of the procedure reported by Blicke and Sheets [F. F. Blicke and Don G. Sheets, J. Am. Chem. Soc. 70 3768 (1948)] was used for the preparation of 3-chloromethylbenzo[b]thiophene by reacting benzo[b]thiophene with formaldehyde in an excess of concentrated hydrochloric acid as follows.

805 g. (5.65 moles) of benzo[b]-thiophene were added dropwise to a stirred mixture of 3600 ml. of concentrated aqueous hydrochloric acid and 540 ml. of a 40% aqueous formalin solution at a temperature of about 5° C. over a period of 3 hours. After stirring for 1 hour, the resulting pinkish mixture was heated to and held at 65° C. for 1 hour. Then the lower organic layer was separated. The aqueous layer was extracted with four 800 ml. portions of benzene. The organic layer and the benzene extracts were combined and then dried by passing through anhydrous potassium carbonate and anhydrous sodium sulfate. Evaporation and fractional distillation through a Vigreux column afforded 831.7 g. (75.3%) of 3-chloromethylbenzo[b]thiophene, b.p. 120–132° C. (0.7–1.9 mm.), $n_D^{24}$ 1.6440. [Lit. b.p. 125–127° C. (2.0 mm.)].

B. Preparation of S-3-benzo[b]thenyl isothiuronium chloride

S-3-benzo[b]thenyl isothiuronium chloride was prepared by the reaction of 3 - chloromethylbenzo[b]thiophene with an excess of thiourea in absolute ethanol as follows.

A sample of 91 g. (1.2 moles) of thiourea in 1500 ml. of absolute ethanol was heated to a temperature of 70° C. to obtain a clear solution. Then 109.9 g. (0.6 mole) of 3-chloromethylbenzo[b]thiophene were added dropwise over a period of 15 minutes. The reaction mixture was then heated under refluxing (83° C.) for 2 hours. On cooling (to an ambient temperature of about 22° C. by stirring for about 30 minutes), a colorless solid weighing 130 g. (84.5% yield) was deposited. It had a melting point of 213–217° C. Recrystallization from absolute ethanol afforded a colorless crystalline solid, m.p. 222.5–224.5° C. (dec.); IR, $\lambda_{max.}^{KBr}$, 3160 cm.$^{-1}$ (broad), 2720 cm.$^{-1}$, 1630 cm.$^{-1}$, 755 cm.$^{-1}$; N.M.R.

$\delta_{TMS}^{DMSO-d_6}$, 4.92 (—CH$_2$S—, singlet), 7.41 (H$_5$+H$_6$, multiplet), 7.90 (H$_2$, singlet), 7.99 (H$_4$+H$_7$, multiplet), 9.46 (2NH$_2$, broad singlet).

*Analysis:* Calculated for C$_{10}$H$_{11}$N$_2$S$_2$Cl: C, 46.46; H, 4.28; N, 10.83; S, 24.78. Found: C, 47.08, 46.82; H, 4.12, 4.45; N, 10.71, 10.64; S, 24.70, 24.47.

C. Hydrolysis of S-3-benzo[b]thenyl isothiuronium chloride

In order to further characterize the structure of S-3-benzo[b]-thenyl isothiuronium chloride, it was hydrolyzed in the presence of sodium hydroxide to yield 3-benzo[b]thenyl mercaptan as follows:

52 g. (0.2 mole) of S-3-benzo[b]thenyl isothiuronium chloride were added to a solution of 28.6 g. of sodium hydroxide in 430 ml. of distilled water at 45° C. The resulting mixture was then heated while stirring to 99° C. and held at 99° C. for 4½ hours, giving a clear yellow solution. On cooling to 15° C. (about 30 minutes), the solution was acidified with concentrated aqueous hydrochloric acid. An organic layer was thereby formed and wasn then separated. The aqueous residue was extracted with 700 ml. of ether in three portions. The organic layer and the ether extracts were combined and dried over anhydrous sodium sulfate. Evaporation and fractional distillation yielded 30.2 g. (83.8%) of a colorless liquid product, 3-thionaphthylmethyl mercaptan, which was characterized as follows, b.p. 104–109° C. (0.25–0.28 mm. Hg, $n_D^{19}$ 1.6733 [Lit. (U.S. Pat. 3,041,351 and Chemical Abstracts 57, 13729 [1962], b.p. 156° C. (9.5 mm.)]; N.M.R.

$\delta_{TMS}^{CCl_4}$ 1.54 (—SH, triplet, J=7 cps), 3.72 (—CH$_2$—, doublet, J=7 cps.), 7.07 (H$_2$, singlet), 7.19 (H$_5$+H$_6$, multiplet), 7.61 (H$_4$+H$_7$, multiplet).

EXAMPLE 2

Preparation of 2-(3-benzo[b]thenyl)-2-thiopseudourea

A suspension of 0.6 g. of S-3-benzo[b]thenyl isothiuronium chloride in 15 ml. of water was chilled in an ice water bath. A 10% aqueous sodium bicarbonate solution was added dropwise until the pH of the solution was above 8. The insoluble product, weighing 0.57 g., was collected, dissolved in 8.0 ml. of ethyl acetate at 25° C. and filtered to remove insoluble impurities. Upon cooling in an ice water bath, the 2-(3-benzo[b]thenyl)-2-thiopseudourea product precipitated out of solution as a white solid. The yield was 0.4 g. of a product having a melting point of 105–107° C. It was characterized as follows:

IR, $\lambda_{max.}^{Nujol}$ 3400, 1620, 1580, 775 cm.$^{-1}$; N.M.R.

$\delta_{TMS}^{DMSO-d_6}$ 4.40 (—CH$_2$S—, singlet), 6.32 (NH$_3$ broad singlet), 7.38 (H$_4$+H$_5$, multiplet), 7.64 (H$_2$, singlet), 7.92 (H$_4$+H$_7$, multiplet). These spectra confirmed the structure of 2-(3-benzo[b]thenyl)-2-thiopseudourea.

Elemental Analysis for $C_{10}H_{10}N_2S_2$; Calculated (percent): C, 54.02; H, 4.54; N, 12.60; S, 28.85. Found (percent): C, 53.87, 53.84; H, 4.60, 4.56; N, 12.13, 12.12; S, 28.05.

This base appears to be unstable after 4 or 5 hours at room temperature, gradually decomposing to yield 3-benzo[b]thenyl mercaptan and cyanamide.

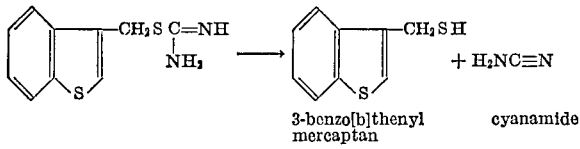

3-benzo[b]thenyl mercaptan    cyanamide

The decomposed sample has a melting range of 110 to 203° C. presumably because of the presence of dicyandiamide (m.p. 212° C.), which forms when cyanamide dimerizes.

EXAMPLE 3

A. Preparation of S-2-benzo[b]thenyl isothiuronium chloride

As described below, a sample of S-2-benzo[b]thenyl isothiuronium chloride was made by the reaction of 2-chloromethylbenzo[b]thiophene with thiourea. The starting 2-chloromethylbenzo[b]thiophene was prepared via the unknown intermediates benzo[b]thiophene-2-carboxylic acid and 2-hydroxymethyl-benzo[b]thiophene as herein above outlined schematically before Example 1.

A yellow solution of 18.3 g. (0.1 mole) of 2-chloromethylbenzo[b]thiophene in 70 ml. of benzene was added dropwise over a period of 80 minutes to a sample of 15.2 g. (0.2 mole) of thiourea in a mixed solvent of 150 ml. of absolute ethanol and 100 ml. of benzene. An exotherm from 25° C. to 28° C. occurred. The reaction mixture was then refluxed for 2 hours. Evaporation yielded a wet, yellow, solid residue. After stirring with 100 ml. of petroleum ether for about 15 minutes, filtration yielded 34 g. of a light yellow solid product having a melting point of 140–156° C. A sample of 25.7 g. of the crude reaction product was stirred at room temperature with 230 ml. of acetonitrile in two portions to yield 14.6 g. of a pale yellow solid having a melting point of 184–188° C. An analytical sample having a melting point of 194–196° C. was prepared by dissolving 0.55 g. of this product in 75 ml. of water at 65° C., filtering and reprecipitating with concentrated aqueous hydrochloric acid. The product, S-2-benzo[b]thenyl isothiuronium chloride, was characterized as follows:

IR, $\lambda_{max.}^{KBr}$ 3150 cm.$^{-1}$ (broad), 2720 cm.$^{-1}$, 1650 cm.$^{-1}$, 750 cm.$^{-1}$;

N.M.R. $\delta_{TMS}^{DMSO-d_6}$ 4.98 (—CH$_2$S—, singlet), 7.34 (H$_5$+H$_6$, multiplet), 7.48 (H$_3$, singlet), 7.85 (H$_4$+H$_7$, multiplet), 9.45 (2NH$_2$, broad singlet).

Analysis: Calculated for $C_{10}H_{11}N_2S_2Cl$: C, 46.46; H, 4.28; N, 10.83; S, 24.78; Cl, 13.70. Found: C, 46.49, 46.28; H, 4.43, 4.52; N, 10.30, 10.28; S, 22.40, 26.93; Cl, 13.48, 13.86.

B. Hydrolysis of S-2-benzo[b]thenyl isothiuronium chloride

In order to differentiate between the corresponding 2- and 3-S-benzo[b]thenyl isothiuronium chloride isomers, S-2-benzo[b]thenyl isothiuronium chloride was hydrolyzed to 2-benzo[b]thenyl mercaptan, a solid product, as follows: 14.6 g. (0.057 mole) of 2-benzo[b]thenyl isothiuronium chloride were added to a solution of 6.4 g. of sodium hydroxide in 100 ml. of water having a temperature of 25° C. An exotherm to 34° C. occurred. After 15 minutes, the reaction mixture was then heated to and held at 98° C. for 4½ hours, giving a yellow solution containing some insoluble material. This solution was then diluted with 200 ml. of water, cooled to a temperature of 15° C. with an ice water bath and acidified with concentrated aqueous hydrochloric acid. The aqueous solution was then extracted with 1000 ml. of benzene in four portions. The yellow benzene extract was washed with water and saturated sodium chloride solution, and then dried over anhydrous sodium sulfate. Evaporation yielded 9.5 g. (100% yield) of a yellow, wet, solid product.

A sample of 4.0 g. of this crude product was chromatographed on silica gel (230 g.), using a cyclohexane-benzene mixture (4:1) for elution. Evaporation of the first main fraction yielded 1.06 g. of pale yellow crystalline plates of 2-benzo[b]thenyl mercaptan, which had the following characteristics, Melting point, 50–51° C. (from cyclohexane);

IR $\lambda_{max.}^{Neat}$ 2550 cm.$^{-1}$, 740 cm.$^{-1}$; N.M.R. $\delta_{TMS}^{CCl_4}$ 1.81

(—SH, triplet, J=8 cps), 3.93 (—CH$_2$—, doublet, J=8 cps.), 7.08 (H$_3$, singlet), 7.14 (H$_5$+H$_6$, multiplet), 7.61 (H$_4$+H$_7$, multiplet).

Analysis: Calculated for $C_9H_8S_2$: C, 59.96; H, 4.47; S, 35.57. Found: C, 59.90, 59.74; H, 4.49, 4.42.

Evaporation of the second main fraction yielded 0.1 g. of colorless crystalline plates of 2-benzo[b]thenyl disulfide, which had the following characteristics. Melting point, 131–132° C. (from ethyl acetate);

IR $\lambda_{max.}^{Nujol}$ 480 cm.$^{-1}$; N.M.R. $\delta_{TMS}^{CDCl_3}$ 3.97

(—CH$_2$—, singlet), 7.10 (H$_3$, singlet), 7.29 (H$_5$+H$_6$, multiplet), 7.73 (H$_4$+H$_7$, multiplet).

Analysis: Calculated for $C_{18}H_{14}S_4$: C, 60.30; H, 3.94; S, 35.77. Found: C, 60.06, 60.04; H, 3.96, 4.00; S, 34.70, 34.39.

The chemical evidence, physical data and biological activity of both 3- and 2-S-benzo[b]thenyl isothiuronium chloride, which are summarized below, show that the structure of the chloride compound of this invention is the 3-isomer of S-benzo[b]thenyl isothiuronium chloride:

S-3-benzo[b]thenyl isothiuronium chloride:
  Melting Point: 222–224° C.
  Mixed melting point with 2-isomer: 165–191° C.
  Infrared spectrum: similar to that of the 2-isomer
  N.M.R. spectrum: For H$_2$, δ=7.90 (see Table I)
  Hydrolysis product: 3-benzo[b]thenyl mercaptan, a liquid; boiling point 104–109° C. (0.28–0.25 mm.); $n_D^{19}$ 1.6733, N.M.R. (see Table II) for H$_2$, δ=7.7 singlet, SH, δ=1.54 triplet. Biological activity: Active as an antiaggression drug.

S-2-benzo[b]thenyl isothiuronium chloride:
M.p.: 194–196° C.
Mixed m.p. with 3-isomer: 165–191° C.
Infrared spectrum: similar to that of the 3-isomer
N.M.R. spectrum: For $H_3$, $\delta$ 7.48 (see Table I)
Hydrolysis product: 2-benzo[b]thenyl mercaptan, a solid, m.p.: 50–51° C. N.M.R. (see Table II) for $H_3$, $\delta=7.08$ singlet, —SH, $\delta=1.81$ triplet. Biological activity: Inactive as an antiaggression drug.

TABLE I

N.M.R. spectral properties of 3- and 2-S-benzo[b]thenyl isothiuronium chloride

| Structure | Chemical shift in p.p.m. | | | | | |
| --- | --- | --- | --- | --- | --- | --- |
|  | —$CH_2S$— | $H_2$ | $H_3$ | $H_5+H_6$ | $H_4+H_7$ | —$NH_2$ |
| 3-isomer | 4.92 | 7.90 |  | 7.41 | 7.99 | 9.46 |
| 2-isomer | 4.98 |  | 7.48 | 7.34 | 7.85 | +9.45 |

TABLE II

N.M.R. spectral properties of 3- and 2-benzo[b]thenyl mercaptan

| Structure | Chemical shift in p.p.m. | | | | | |
| --- | --- | --- | --- | --- | --- | --- |
|  | —SH | —$CH_2$— | $H_2$ | $H_3$ | $H_5+H_6$ | $H_4+H$ |
| 3-isomer | 1.54 | 3.72 | 7.07 |  | 7.19 | 7.61 |
| 2-isomer | 1.81 | 3.93 |  | 7.08 | 7.14 | 7.61 |

EXAMPLE 4

A. Preparation of 3-bromomethylbenzo[b]thiophene

To a stirred mixture of 400 ml. of 40% aqueous hydrobromic acid and 60 ml. of 40% aqueous formaldehyde at 6° C. were added, dropwise, 80 g. (0.6 mole) of benzo[b]thiophene over a period of 20 minutes. After stirring for 1 hour, the reaction mixture was heated and held at 65° C. for one hour and then chilled to 15° C., followed by the addition of 500 ml. of ice water, and then extracted with 900 ml. of benzene in three portions. The extracts were combined and dried by passing through anhydrous potassium carbonate and anhydrous sodium sulfate. Evaporation on a steam bath yielded 136 g. of a dark brown crude liquid product. Fractional distillation removed 9.5 g. of low-boiling material. The higher boiling residue, 3 - bromomethylbenzo[b]thiophene, weighed 95 g. (70% yield).

B. Preparation of S-3-benzo[b]thenyl isothiuronium bromide 95 g. of the 3-bromobenzo[b]thiophene prepared above was suspended in 200 ml. of absolute ethanol and added to a refluxing solution (80° C.) of 64 g. (0.84 mole) of thiourea in 600 ml. of absolute ethanol. Reflux was continued for two hours, and the resultant dark brown solution was then allowed to cool to room temperature and filtered to remove a trace amount of insoluble material. Evaporation of the filtrate yielded 122.4 g. of a pale yellow solid product, m.p. 138–168° C. Trituration of the crude product in 125 ml. of acetone yielded 65 g. (51% yield) of the product, S-3-benzo[b]thenylisothiuronium bromide, m.p. 205–210° C. An analytical sample, m.p. 207–209° C., was prepared by dissolving 1.0 g. of the product in 25 ml. of absolute ethanol and 1.0 ml. of water and reprecipitating with the addition of 40% aqueous hydrobromic acid. It was characterized as follows:

IR, $\lambda_{max}^{Nujol}$ 3250 cm.$^{-1}$ (broad), 3100 cm.$^{-1}$, 1635 cm.$^{-1}$, 755 cm.$^{-1}$; N.M.R. $\delta_{TMS}^{DMSO-d_6}$ 5.02

(—$CH_2S$—, singlet), 7.45 ($H_5+H_6$, multiplet), 8.00 $H_2+H_4+H_7$, multiplet), 9.35 (2$NH_2$, broad singlet).

Analysis: Calculated for $C_{10}H_{11}BrN_2S_2$ (percent): C, 39.61; H, 3.66; Br, 26.35; N, 9.24; S, 21.15. Found (percent): C, 38.76, 39.01; H, 3.79, 3.79; Br, 24.60, 24.58; N, 8.71, 8.83; S, 20.3, 20.1.

EXAMPLE 5

Preparation of S-3-benzo[b]thenyl isothiuronium iodide

A mixture of 12.9 g. (0.05 mole) of S-3-benzo[b]thenyl isothiuronium chloride and 45 g. (0.3 mole) of sodium iodide in 1000 ml. of acetone was heated under reflux (55° C.) for 29 hours, resulting in a yellow solution with a trace of precipitate. Filtration removed 3.2 g. of a white solid. Evaporation of the filtrate gave 72.4 g. of a pale yellow residue. The residue was stirred with 61 ml. of water and filtered and dried to yield 22 g. of crude S-3-benzo[b]isothiuronium iodide, m.p. 167–172° C. Recrystallization from 23/77% ethanol/$H_2O$ solution and rinsing with ethyl acetate afforded a colorless analytical sample, m.p. 173–174° C., which was characterized as follows:

IR, $\lambda_{max}^{Nujol}$ 3300 cm.$^{-1}$, 3100 cm.$^{-1}$, 1610 cm.$^{-1}$, 755 cm.$^{-1}$;

N.M.R. $\delta_{TMS}^{DMSO-d_6}$ 4.85 (—$CH_2S$—, singlet), 7.45 ($H_5+H_6$, multiplet), 7.86 ($H_2$, singlet), 8.02 ($H_4+H_7$, multiplet), 9.09 (2$NH_2$, broad singlet).

Analysis: Calculated for $C_{10}H_{11}N_2S_2I$ (percent): C, 34.29; H, 3.16; N, 8.00; S, 18.31; I, 36.24. Found (percent): C, 34.56; 34.58; H, 3.25, 3.14; N, 8.16, 8.25; S, 17.42, 17.44; I, 37.44, 37.22.

EXAMPLE 6

Preparation of S-3-benzo[b]thenyl isothiuronium acetate

To a solution of 0.5 g. (0.006 mole) of sodium acetate in 5.0 ml. of water, a suspension of 1.0 g. (0.0039 mole) of S-3-benzo[b]thenyl isothiuronium chloride in 10 ml. of absolute ethanol and 1.0 ml. of water at 50° C. was added. The clear reaction solution was heated on a hot water bath for 5 minutes. On cooling, it yielded 0.89 g. (82% yield) of a colorless solid product, S-3-benzo[b]thenyl isothiuronium acetate, m.p. 148–150° C., which was characterized as follows:

IR, $\lambda_{max}^{Nujol}$ 3400 cm.$^{-1}$, 1630 cm.$^{-1}$, 1550 cm.$^{-1}$, 760 cm.$^{-1}$; N.M.R. $\delta_{TMS}^{DMSO-d_6}$ 1.76

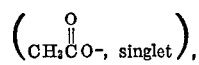

4.60 (—$CH_2S$—, singlet), 7.96 ($H_4+H_7$, multiplet), 8.26 (2$NH_2$, broad singlet), 7.75 ($H_2$, singlet), 7.41 ($H_5+H_6$, multiplet).

Analysis: Calculated for $C_{12}H_{14}N_2O_2S_2$ (percent): C, 51.04; H, 5.00; N, 9.93; S, 22.71. Found (percent): C, 50.94, 50.94; H, 5.32, 5.21; N, 9.45, 9.51; S, 22.96, 22.96.

EXAMPLE 7

Preparation of S-3-benzo[b]thenyl isothiuronium benzoate

To a solution of 0.87 g. (0.006 mole) of sodium benzoate in 7 ml. of water, a suspension of 1.0 g. (0.0039 mole) of S-3-benzo[b]thenyl isothiuronium chloride in 10 ml. of absolute ethanol and 1.0 ml. of water at 50° C. was added. As a white precipitate was formed immediately, an additional 20 ml. of water was added. The resulting mixture was then heated at 65° C. for 10 minutes. Filtration yielded 1.47 g. (100% yield) of a white solid, S-3-benzo[b]thenyl isothiuronium benzoate, m.p. 175–176° C. Recrystallization from ethanol yielded an analytical sample, m.p. 166–168° C., which was characterized as follows:

IR, $\lambda_{max.}^{Nujol}$ 3200 cm.$^{-1}$ (broad), 1590 cm.$^{-1}$, 1250 cm.$^{-1}$, 1150 cm.$^{-1}$, 755 cm.$^{-1}$; N.M.R. $\delta_{TMS}^{DMSO-d_6}$ 4.78

(—CH$_2$S—, singlet), 6.80 (2NH$_2$, broad singlet), two multiplets centered at 7.45 and 7.90 for the aromatic protons.

*Analysis:* Calculated for C$_{17}$H$_{16}$N$_2$O$_2$S$_2$ (percent): C, 59.38; H, 4.68; N, 8.13; S, 18.62. Found (percent): C, 56.33, 56.33; H, 4.49, 4.61; N, 8.49, 8.49; S, 19.51, 19.52.

EXAMPLE 8

Preparation of S-3-benzo[b]thenyl isothiuronium p-toluenesulfinate

A sample of 0.5 g. (0.028 mole) of sodium p-toluenesulfinate in 5.0 ml. of water was warmed on a water bath to give a clear solution. To this aqueous solution of sodium p-toluenesulfinate, a suspension of 1.0 g. (0.0039 mole) of S-3-benzo[b]thenyl isothiuronium chloride in 10 ml. of absolute ethanol and 1.0 ml. of water at 50° C. was added. The resulting mixture was heated at 65° C .for 5–8 minutes. On cooling, 0.91 g. (63% yield) of a colorless, solid product, S-3-benzo[b]thenyl isothiuronium p-toluene sulfinate, was obtained. Recrystallization from an ethanol-water mixture afforded an analytical sample, m.p. 168–169° C., which was characterized as follows:

IR, $\lambda_{max.}^{Nujol}$ 3200 cm.$^{-1}$, 1670 cm.$^{-1}$, 750 cm.$^{-1}$; N.M.R. $\delta_{TMS}^{DMSO-d_6}$ 2.30

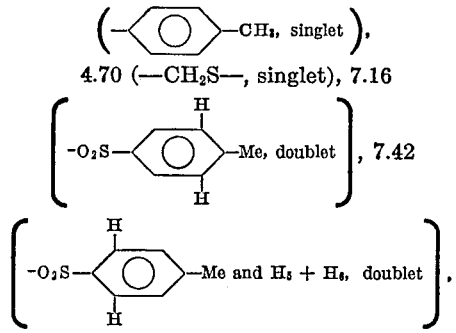

4.70 (—CH$_2$S—, singlet), 7.16

7.95 (H$_4$+H$_7$, multiplet), 9.90 (2NH, broad singlet), 7.77 (H$_2$, singlet).

*Analysis:* Calculated for C$_{17}$H$_{18}$N$_2$O$_2$S$_3$ (percent): C, 53.94; H, 4.80; N, 7.40; S, 25.41. Found (percent): C, 52.61, 52.79; H, 5.15, 5.06; N, 7.08, 7.12; S, 24.39, 24.24.

EXAMPLE 9

Preparation of S-3-benzo[b]thenyl isothiuronium p-toluene-sulfonate

To a solution of 0.6 g. (0.038 mole) of the sodium salt of p-toluenesulfonic acid a suspension of 1.0 g. (0.0039 mole) of S-3-benzo[b]thenyl isothiuronium chloride in 10 ml. of absolute ethanol and 1.0 ml. of water at 50° C. was added. Heating at 75° C. for 10 minutes gave a clear solution. On cooling, 0.77 g. (50.5% yield) of a colorless solid, S-3-benzo[b]thenyl isothiuronium p-toluenesulfonate, was obtained. Recrystallization from ethanol-water afforded analytical sample, m.p. 170–172° C., which was characterized as follows:

IR, $\lambda_{max.}^{Nujol}$ 3260 cm.$^{-1}$, 1660 cm.$^{-1}$, 1200 cm.$^{-1}$, 1030 cm.$^{-1}$, 775 cm.$^{-1}$; N.M.R. $\delta_{TMS}^{DMSO-d_6}$ 2.28

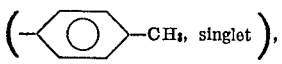

4.78 (—CH$_2$—S—, singlet), 7.12

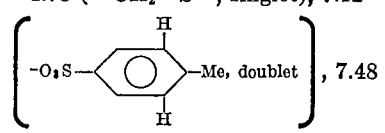

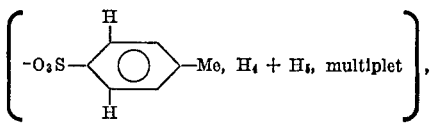

7.81 (H$_2$, singlet), 7.98 (H$_4$+H$_7$, multiplet), 9.17 (2NH$_2$, broad singlet).

*Analysis:* Calculated for C$_{17}$H$_{18}$N$_2$O$_3$S$_3$ (percent): C, 51.75; H, 4.60; N, 7.10; S, 24.35. Found (percent): C, 52.45, 52.33; H, 4.84, 4.83; N, 7.11, 7.09; S, 24.53, 24.36.

The most outstanding property of the compounds of the present invention, and particularly the chloride, S-3-benzo[b]thenyl isothiuronium chloride, is the highly selective abolition of aggressive behavior in doses which cause little or no signs or symtoms of central nervous system depression or toxicity. The compounds can be classified as psychotherapeutic agents, but are unique in that no other agent of this class possesses the same spectrum of activity. The compounds of the present invention have neuropharmacological profiles [1] in mice which resemble those of the major tranquilizers such as chlorpromazine. They differ from chlorpromazine, however, in that they are much weaker depressants of motor activity in the mouse. The compounds of Examples 10–16 of Table III below, in addition to having positive neuropharmacological profiles, all gave 100% protection in the isolated fighting mouse assay. In particular, S-3-benzo[b]thenyl isothiuronium chloride was very active in inhibiting aggressive behavior in three models of experimental aggression; namely, isolated fighting behavior in mice, electroshock-induced fighting in mice, and septal rat aggression. In a comparative study with a major tranquilizer, chlorpromazine, and a minor tranquilizer, chlordiazepoxide, the chloride of the present invention was found to be much more selective in inhibiting aggressive behavior than the latter two agents. It does not possess significant anti-convulsant activity and in this respect it differs from chlordiazepoxide. It does, however, cause a significant hypothermia, which indicates an activity resembling chlorpromazine and other major tranquilizers. It is a weak potentiator of pentobarbital and is inactive in the dl-dopa fighting test for monoamine oxidase inhibitors. It apparently does not possess antidepressant activity since it did not reverse tetrabenazine ptosis. The chloride of the present invention is orally active in mice and rats and orally is less toxic than chlorpromazine and chlordiazepoxide. By contrast with the chloride of the present invention, S-3-benzo[b]thenyl isothiuronium chloride, its 2-isomer, S-2-benzo[b]thenyl isothiuronium chloride

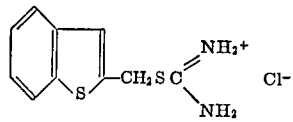

had no activity as an antiaggression drug.

Table III lists, in addition to compounds of the present invention (Examples 10–16), fourteen related compounds, including the 2-isomer of the chloride (Example 29), which were tested for similar activity but with negative results.

---
[1] The neuropharmacological profile is a standard procedure (see, e.g. Samuel Irwin, *Science*, *136*, 123 [1962]) employed in screening a compound to determine its usefulness as a Central Nervous System active compound. When a compound is found to have sufficient activity to warrant follow-up, the first antiaggression screen, the fighting mouse assay, is determined.

TABLE III.—NEUROPHARMACOLOGICAL PROFILE

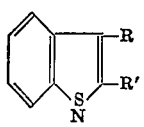

| Example No. | n | R | R' | Pharm. profile |
|---|---|---|---|---|
| 10 | — | —CH$_2$—S—C(=NH$_2^{\oplus}$)(NH$_2$) Cl$^{\ominus}$ | H | +++ |
| 11 | — | —CH$_2$—S—C(=NH$_2^{\oplus}$)(NH$_2$) Br$^{\ominus}$ | H | +++ |
| 12 | — | —CH$_2$—S—C(=NH$_2^{\oplus}$)(NH$_2$) C$_6$H$_5$—COO$^{\ominus}$ | H | +++ |
| 13 | — | —CH$_2$—S—C(=NH$_2^{\oplus}$)(NH$_2$) I$^{\ominus}$ | H | +++ |
| 14 | — | —CH$_2$—S—C(=NH$_2^{\oplus}$)(NH$_2$) H$_3$C—C$_6$H$_4$—SO$_3^{\ominus}$ | H | +++ |
| 15 | — | —CH$_2$—S—C(=NH$_2^{\oplus}$)(NH$_2$) H$_3$C—C$_6$H$_4$—SO$_3^{\ominus}$ | H | +++ |
| 16 | — | —CH$_2$—S—C(=NH$_2^{\oplus}$)(NH$_2$) CH$_3$COO$^{\ominus}$ | H | +++ |
| 17 | — | H | —COOEt | — |
| 18 | — | —CH$_2$Cl | H | — |
| 19 | — | —CH$_2$CH$_2$COOH | H | — |
| 20 | — | —CH$_2$—CH(COOEt)$_2$ | H | — |
| 21 | — | —CH$_2$—CH(COOH) | H | — |
| 22 | — | H | —CH$_2$OH | (Hypnotic) + |
| 23 | O$_2$ | —O—Et | H | — |
| 24 | O$_2$ | —CH$_2$—S—Ph | H | — |
| 25 | O$_2$ | —CH$_2$Cl | H | — |
| 26 | O$_2$ | H | —SO$_2$Ph(pMe) | — |
| 27 | — | H | —CH$_2$CH$_2$OH | — |
| 28 | — | —CH$_2$—S—benzothiazolyl | H | — |
| 29 | — | H | —CH$_2$—S—C(=NH$_2^{\oplus}$)(NH$_2$) Cl$^{\ominus}$ | (Hypnotic) + |
| 30 | — | —CH$_2$—SH | H | — |

Note.—+++ indicates active; — indicates inactive; + indicates weakly active.

Example 23 is the 2:3-dihydro derivative; Example 29 is the 2-benzo[b]chloride isomer, which showed some CNS depressant activity in the neuropharmacological profile with mild hypnotic activity. In further hypnotic assays this compound proved inactive and, more important, was inactive in the isolated fighting mouse and the septal rat tests. By contrast, its 3-isomer (the chloride of the present invention [Example 10]) was very active in the latter two tests, which are diagnostic tests for antiaggression activity.

In the neuropharmacological profile, which is a standardized multidimensional observation technique used on mice to grade symptomatology and acute toxicity relative to dosage, the S-3-benzo[b]thenyl isothiuronium chloride compound of the present invention caused convulsions and/or death after intraperitoneal doses of 300 and 100 mg./kg. After doses of 30, 10, and 3 mg./kg., depression, hypothermia, hypo- and hyper-reflexia, reduced motor activity, and some degree of catatonia were observed. Depending upon the dose used, the onset of action varied from 4 to 30 minutes.

Similar observations were noticed after oral administration of this compound, except that no convulsions were observed at the 300 mg./kg. dose. In addition, the onset of action was longer, ranging from 15 to 60 minutes. These observations indicate a lesser degree of absorption following oral administration as compared to intraperitoneal dosing.

S-3-benzo[b]thenyl isothiuronium chloride and two commonly used tranquilizers were subjected to the spontaneous locomotor activity test, in which six mice or rats per dose were placed in individual photocell activity cages 30 minutes (mice) or 60 minutes (rats) after i.p. (intraperitoneal) administration of the drug for a 30 minute activity count. Table IV shows the results obtained by comparing drug-treated groups with control activity, the $SD_{50}$ being that dose causing a 50% reduction from control activity.

TABLE IV

Spontaenous Locomotor Activity I.P. $SD_{50}$ (mg./kg.)

| | Mice | Rats |
|---|---|---|
| S-3-benzo[b]thenyl isothiuronium chloride | 21.6 | 47.5 |
| Chlorpromazine | 2.8 | 1.7 |
| Chlordiazepoxide | 12.8 | 14.0 |

S-3-benzo[b]thenyl isothiuronium chloride appears to possess a much weaker depressant action in both mice and rats in comparison with chlorpromazine (major tranquilizer) and chlordiazepoxide (minor tranquilizer).

In addition, S-3-benzo[b]thenyl isothiuronium chloride exhibited depressant activity when given orally, with an $SD_{50}$ of 85.5 mg./kg. in mice and greater than 200 mg./kg. in rats.

In the neurotoxicity test, the value $NTD_{50}$ is defined as the dose necessary to cause 50% of mice or rats trained to walk a rotating wooden rod (5 r.p.m.) to fall at the time of peak effect, and is a measure of drug effects on motor function or central nervous system toxicity. The results set forth in Table V were obtained when S-3-benzo[b]thenyl isothiuronium chloride was tested against chlorpromazine and chlordiazepoxide.

TABLE V.—NEUROTOXICITY

| | $NTD_{50}$ (m.g./kg.) | (95% confidence limits) |
|---|---|---|
| Mice | | |
| I.p.:[1] | | |
| S-3-benzo[b]thenyl isothiuronium chloride | 155.0 | (119.4-200.1) |
| Chlorpromazine | 0.7 | (0.4-1.1) |
| Chlordiazepoxide | 13.8 | (7.1-27.0) |
| P.O.:[2] S-3-benzo[b]thenyl isothiuronium chloride | 83.0 | (47.1-146) |
| Rats | | |
| I.p.: | | |
| S-3-benzo[b]thenyl isothiuronium chloride | 35.5 | (23.7-53.1) |
| Chlorpromazine | 1.7 | (1.0-2.8) |
| Chlordiazepoxide | 8.8 | (5.9-13.1) |
| P.O.: S-3-benzo[b]thenyl isothiuronium chloride | 300.0 | |

[1] Intraperitoneal.
[2] Oral (Per Os).

The time of peak effect for each agent in both species was 15–30 minutes after drug administration.

Again, S-3-benzo[b]thenyl isothiuronium chloride was less potent than either reference drug. In addition, S-3-benzo[b]thenyl isothiuronium chloride appeared to be more centrally toixc in rats than in mice.

This compound was also compared with chloropromazine and chlordiazepoxide for its anti-aggressive activity. Four models of experimentally-induced aggression in rodents were studied (R. D. Sofia, *Life Sciences* 8: 705, 1969). The results of these experiments are summarized in Table VI.

The results of this study indicate that the S-3-benzo[b]thenyl isothiuronium chloride compound of the present invention possesses selective anti-aggressive activity against isolation-induced aggression and septal rat aggression, which no standard psychotherapeutic agent possesses. In comparison with chlorpromazine and chlordiazepoxide, using the ratio between $NTD_{50}$ and $ED_{50}$ in these models, S-3-benzo[b]thenyl isothiuronium chloride possesses a high degree of specificity in combating experimentally-induced aggressive behavior. Drug specificity on these studies was considered selective only when it occurred at doses which were significantly lower than those which impaired rotarod performance ($NTD_{50}$) or resulted in a ratio ($NTD_{50}/ED_{50}$) of greater than 1.0.

Electroshock-induced fighting is a test procedure that selectively depicts anti-anxiety activity. This fact was shown since chlordiazepoxide was quite active.

Killer rat aggression appears to be a test which selectively indicates anti-depressant and stimulant activity since reference agents from both these classes of drugs are selectively active (R. D. Sofia, *Life Sciences*, 8: 120, 1969). None of the drugs tested selectively inhibited killer rat behavior.

Chlorpromazine was able to block all types of aggressive behavior, but only after doses which caused neurotoxicity, which is expected of this major tranquilizer.

Hence, S-3-benzo[b]thenyl isothiuronium chloride differs from both chlorpromazine and chlordiazepoxide in that it selectively inhibits septal rat aggression and isolated mouse aggression at doses well below those causing signs of neurotoxicity. In addition, this degree of selectivity of S-3-benzo[b]thenyl isothiuronium chloride for anti-aggressive activity is further supported by the fact that it is quite active at doses well below doses inhibiting spontaneous locomotor activity.

TABLE VI.—ANTI-AGGRESSIVE ACTIVITY $ED_{50}$ (95% confidence limits) (mg./kg.)

| Agent | I.p. $ED_{50}$ | $NTD_{50}/ED_{50}$ | P.O. $ED_{50}$ | $NTD_{50}/ED_{50}$ |
|---|---|---|---|---|
| *Isolated mouse aggression* | | | | |
| S-3-benzo[b]thenyl isothiuronium chloride | 2.6 (1.0-6.7) | 60.0 | 8.3 (4.6-15.2) | 10.0 |
| Chlorpromazine | 2.8 (2.0-3.9) | 0.3 | 6.9 (5.1-9.4) | 1.7 |
| Chlordiazepoxide | 20.5 (11.3-37.5) | 0.7 | 35.0 (25.4-48.3) | 1.5 |
| *Electroshock-induced fighting in mice* | | | | |
| S-3-benzo[b]thenyl isothiuronium chloride | Weakly active | | | |
| Chlorpromazine | 5.5 (3.1-9.9) | 0.1 | 0.86 (0.39-1.88) | 14.0 |
| Chlordiazepoxide | 4.2 (2.3-7.7) | 3.3 | 3.0 (1.7-5.4) | 18.0 |
| *Septal rat aggression* | | | | |
| S-3-benzo[b]thenyl isothiuronium chloride | 7.0 (3.9-12.7) | 5.1 | 4.2 (2.3-7.6) | 72.0 |
| Chlorpromazine | 10.7 (4.5-25.7) | 0.2 | 11.4 (6.1-21.4) | 0.9 |
| Chlordiazepoxide | 25.8 (14.0-47.5) | 0.4 | 23.7 (13.0-59.0) | 0.49 |
| *Killer rat aggression* | | | | |
| S-3-benzo[b]thenyl isothiuronium chloride | 47.0 (38.9-57.0) | 0.8 | | |
| Chlorpromazine | 7.2 (4.3-11.8) | 0.2 | 17.4 (10.1-29.8) | 0.6 |
| Chlordiazepoxide | 36.3 (24.2-54.4) | 0.3 | 74.0 (53.1-102.8) | 0.15 |

Anticonvulsant activity was tested in the following procedures.

1. Maximal Electroshock Seizures ($MES_{50}$)

In this study, groups of ten mice each are injected i.p. (intraperitoneally) with vehicle and test drug and placed in individual plexiglas squares. Thirty minutes after i.p. injection each mouse is administered an electric shock transcorneally at 50 mA. intensity, 0.2 seconds duration (Swinyard, et. al., *J. Pharmacol. Exptl.* 106: 319, 1952). The criterion for activity is protection against tonic extension of the hind limbs. The dose necessary to protect 50% of the mice ($MES_{50}$) was determined. The following results were obtained:

TABLE VII

Maximal electroshock seizures

| Agent | I.p. $MES_{50}$ mg./kg. |
|---|---|
| S-3-benzo[b]thenyl isothiuronium chloride | 125. |
| Chlorpromazine | Inactive (25 mg./kg.). |
| Chlordiazepoxide | 41.5 (37.8-35.6). |

S-3-benzo[b]thenyl isothiuronium chloride is much less potent than chlordiazepoxide in protecting against MES but differs from chlorpromazine in that the latter is completely devoid of activity.

2. Pentylenetetrazol Seizures (MET$_{50}$)

In this test (modification of the method introduced by Everett and Richard, *J. Pharmacol. Exptl. Ther.*, 81: 402, 1944), groups of ten mice each are pretreated i.p. with vehicle and various doses of test compound and placed in plexiglas squares. Thirty minutes later, all mice are injected subcutaneously (s.c.) with pentylenetetrazol at 125 mg./kg. and observed immediately thereafter for convulsions and death for a period of 1 hour. The dose necessary to protect 50% of the mice (MET$_{50}$) for each parameter was determined. The following results were obtained:

TABLE VIII
Pentylenetetrazol seizures

| Agent | I.p. MET$_{50}$ mg./kg. |
|---|---|
| S-3-benzo[b]thenyl isothiuronium chloride. | Inactive (100 mg./kg.). |
| Chlorpromazine | Inactive (100 mg./kg.). |
| Chlordiazepoxide | 7.1 (5.6–90) for convulsions. 2.6 (2.2–3.1) for death. |

Of the drugs tested, only chlordiazepoxide exhibited anti-pentylenetetrazol activity.

d-Amphetamine Aggregation

Protection from d-amphetamine aggregation-induced lethality is usually afforded by alpha-adrenergic-blocking agents such as chlorpromazine, penoxybenzamine, etc. Percent protection was determined for each compound and an ED$_{50}$ value calculated. The results are summarized in Table IX.

TABLE IX
d-Amphetamine aggregation

| Agent | ED$_{50}$ mg./kg. |
|---|---|
| S-3-benzo[b]thenyl isothiuronium chloride | 50 mg./kg. |
| Chloropromazine | 1.2 (0.8–1.8) mg./kg. |
| Chlordiazepoxide | Inactive (50 mg./kg.). |

In this test procedure, S-3-benzo[b]thenyl isothiuronium chloride has approximately 1/40th the potency of chlorpromazine, while chlordiazepoxide is completely inactive. Therefore, the chloride of the present invention can be considered to possess very weak alpha-adrenergic blocking activity.

Drug Interaction Studies

S-3-benzo[b]thenyl isothiuronium chloride, chlorpromazine, and chlordiazepoxide were compared in the following drug interaction studies.

1. Pentobarbital

S-3-benzo[b]thenyl isothiuronium chloride, chlorpromazine, and chlordiazepoxide were administered at various doses intraperitoneally 30 minutes prior to 50 mg./kg. i.p. injection of sodium pentobarbital. This procedure detects compounds which possess analeptic or potentiating properties. The duration of sleeping time, as measured by loss of righting reflux, was determined. The results are presented as percent of control sleeping time and are shown in Table X.

TABLE X
Percent increase in control sleep time

| I.p. dose mg./kg. | S-3-benzo[b]thenyl isothiuronium chloride | Chlorpromazine | Chlordiazepoxide |
|---|---|---|---|
| 0.5 | | 124 | |
| 1.0 | | 240 | |
| 2.0 | | 300 | |
| 5.0 | | | 26 |
| 10.0 | 120 | | 48 |
| 20.0 | | | 159 |
| 25.0 | 162 | | |
| 40.0 | 200 | | 177 |

On a dose to dose relationship, S-3-benzo[b]thenyl isothiuronium chloride appears to have approximately 1/20th the potency of chlorpromazine. That is, it requires about 20 times as much of S-3-benzo[b]thenyl isothiuronium chloride as of chlorpromazine to achieve the same potency. On the other hand, at the same dosage, 10 mg./kg., S-3-benzo[b]thenyl isothiuronium chloride has approximately two to three times more potency than chlordiazepoxide. Therefore, this compound of the present invention shows potentiation of barbiturate anesthesia.

2. Dihydroxyphenylalanine (dl-DOPA) Fighting Test

It is well known that when monamine oxidase (MAO) inhibitors are given prior to the noradrenaline precursor, dl-DOPA, convulsions or excitation occur. In this study, the MAO inhibitor, pargyline (80 mg./kg.), was given 1, 2, and 4 hours prior to administering 200 mg./kg. of dl-DOPA. Results of this experiment are manfested by excitation, salivation, jumping, and fighting. When S-3-benzo[b]thenyl isothiuronium chloride (60 mg./kg.), chlorpromazine (5 mg./kg.), or chlordiazepoxide (15 mg./kg.) were adminstered instead of pargyline, these symptoms were not observed. Thus, in this procedure, none of the agents tested appear to be MAO inhibitors.

3. Yohimbine Potentiation

Potentiation of lethality induced by the alpha-adrenergic blocking agent, yohimbine, is considered by some investigators as a reliable procedure to classify possible antidepressant compounds (R. M. Quinton, *Brit. J. Pharmacol.*, 21: 51, 1963). An ED$_{50}$ in this test is defined as that dose of test drug which will cause the LD$_1$ (25 mg./kg. i.p.) of yohimbine to be converted to the LD$_{50}$ value. Groups of ten mice each are placed in a tote box and are injected with vehicle or test drug. Thirty minutes later each mouse is injected i.p. with yohimbine at 25 mg./kg. Sixty minutes following yohimbine administration, the number of deaths in each tote box for each dose of test drug is recorded. (Vehicle-treated mice should have none or one of ten mice dead.) Neither chlorpromazine (10 mg./kg.) nor chlordiazepoxide (20 mg./kg.) was active in this test. However, S-3-benzo[b]-thenyl isothiuronium chloride resulted in an ED$_{50}$ value of 54.2 mg./kg. (29.2–101.5). Since S-3-benzo[b]thenyl isothiuronium chloride was not selectively active in the killer rat aggression test, which appears to detect antidepressant activity, it is possible that this agent might possess weak antidepressant activity at doses which causes neurotoxicity. Hence, a third test for detection of antidepressant activity was conducted.

4. Antagonism of Tetrabenazine-induced Ptosis

Groups of mice were given 32 mg./kg. of tetrabenazine intraperitoneally 30 minutes after an injection of S-3-benzo[b]thenyl isothiuronium chloride (30 mg./kg.). The degree of ptosis (eyelid drooping or closure) was then determined exactly 30 minutes after tetrabenazine administration. S-3-benzo[b]thenyl isothiuronium chloride did not reverse tetrabenazine-induced ptosis as do the antidepressants desipramine and amitriptyline.

5. Oxotremorine Antagonism

Antagonism of the pharmacological effects of oxotremorine, a potent cholinergic stimulant, was studied in mice after intraperitoneal administration of S-3-benzo[b]thenyl isothiuronium chloride (100 mg./kg.). (F. Sjoquist and J. Gillette, *Life. Sci.*, 4: 1031, 1965). In this test, groups of ten mice are individually placed into plexiglas squares. Mice are injected i.p. with the vehicle or test drug thirty minutes prior to an i.p. injection of oxotremorine at 0.5 mg./kg. Immediately following oxotremorine administration, the mice are observed for salivation and tremors. Peripheral anticholinergic activity is assessed by inhibition of salivation, and central activity by inhibition of tremors. At 100 mg./kg., S-3-benzo[b]thenyl isothiuronium chloride was completely devoid of any anticholinergic activity.

6. Lethality Study

Table XI gives the results of five day lethality studies following single injections of a drug. All values presented represent tests conducted when animals were housed ten per cage. S-3-benzo[b]thenyl isothiuronium chloride is compared with chlorpromazine and chloridiazepoxide. In these and all the preceding calculations, the method of Litchfield and Wilcoxon (*J. Pharmacol. Exptl. Ther.* 96: 99, 1949) was used to estimate the effective ($ED_{50}$) or lethal ($LD_{50}$) dose.

TABLE XI $LD_{50}$ (95% confidence limits) mg./kg.

| Agent | Mice | | Rats | |
|---|---|---|---|---|
| | I.p. | P.O. | I.p. | P.O. |
| S-3-benzo[b]thenyl isothiuronium chloride | 685 (413–1,090) | 1,310 (972–1,765) | 67.5 (53.1–75.7) | 890 (581–1,356) |
| Chlorpromazine | 136 (106–174) | 280 (187–418) | 137 (133–141) | 357.7 (237.7–538.5) |
| Chlordiazepoxide | 400 (265–604) | 810 (688–958) | 265 (224–313) | 392.1 (235.5–753.5) |

These data show that S-3-benzo[b]thenyl isothiuronium chloride is much less toxic in mice than in rats when administered intraperitoneally and that it is much less toxic for both methods of administration in mice and when orally administered to rats when compared to the two standard reference drugs.

The compounds of the present invention, either alone or in the form of a pharmaceutical composition, may be administered to an animal subject in any of a number of forms and via any of several routes. Thus, the compounds or compositions thereof may be orally administered in the form of tablets, pills, capsules or in the form of a solution or liquid suspension. They may also be administered in the form of a parenteral suspension or solution. The compounds or compositions thereof may also be administered rectally, in the form of a suppository.

When orally administering the compounds or compositions, use can be made of a tablet, pill or capsule consisting entirely of the desired compound, although ordinarily, a composition comprising an effective amount of the compound and varying amounts of one or more physiologically inert materials such as carriers, vehicles, binders and the like will be used. Additionally, the compounds may be orally administered in the form of a suspension thereof in a suitable vehicle such as a syrup.

When parenterally administering the compounds or compositions, use may be made of a parenteral solution or suspension thereof in a suitable solvent or suspension medium.

The compounds and compositions of the present invention may also be administered rectally in the form of a suppository comprising an effective amount of the desired compound and a suitable vehicle such as petroleum jelly.

The following examples are specific formulations of compositions in accordance with the invention.

EXAMPLE 31

Tablets may be prepared by the compression of a wet granulation containing the following:

Ingredients: In each

S-3-benzo[b]thenyl isothiuronium chloride mg 5
Polyvinylpyrrolidone mg 6
Lactose mg 25
Alcohol, 3A, 200 proof ml 1
Stearic acid mg 3
Talc mg 4
Corn starch mg 15

Dosage: 1 Tablet 3 times a day.

EXAMPLE 32

A liquid suspension for oral administration may be prepared in the following formulation:

Ingredients: In each 5 cc.

S-3-benzo[b]thenyl isothiuronium chloride mg 5
Sodium carboxymethylcellulose mg 5
Syrup USP q.s. to cc 5

Dosage: 1 teaspoonful (5 cc.) every 3 to 4 hours.

EXAMPLE 33

Dry filled capsules (DFC) consisting of two sections of hard gelatin may be prepared from the following formulation:

Ingredients: In each

S-3-benzo[b]thenyl isothiuronium chloride 5 mg.
Lactose USP q.s.

Dosage: 1 capsule three times a day.

EXAMPLE 34

A parenteral suspension for intra-muscular administration may be prepared in the following formulation:

Ingredients: In each

S-3-benzo[b]thenyl isothiuronium chloride mg 5
Isotonic solution (0.85% saline) cc 5
Surfactant (a 1% solution of polysorbate 80 USP) cc 1

EXAMPLE 35

A suppository capsule may be formulated as below:

Ingredients: In each

S-3-benzo[b]thenyl isothiuronium chloride 5 mg.
Cocoa butter q.s.

Dosage: 1 suppository every 3 to 4 hours.

Variations can, of course, be made without departing from the spirit and scope of the invention.

What is claimed is:

1. A pharmaceutical preparation in dosage unit form adapted for administration to obtain selective inhibition of aggressive behavior comprising an anti-aggression-effective non-toxic amount within the range from about 2 to about 8 mg./kg. of body weight of a compound selected from the group consisting of the base, 2-(3-benzo[b]thenyl)-2-thiopseudourea, or a pharmaceutically acceptable salt thereof in combination with a physiologically acceptable carrier and/or diluent therefor.

2. The composition of claim 1 in an orally administrable dosage form.

3. The composition of claim 2 wherein said orally administrable dosage form is a pill, tablet or capsule.

4. The composition of claim 2 wherein said orally administrable dosage form is a suspension or solution.

5. The composition of claim 4 wherein said suspension or solution comprises about 5 mg. of said compound per cc.

6. The composition of claim 1 in parenteral dosage form.

7. The composition of claim 6 wherein said parenteral dosage comprises a suspension or solution of about 2 mg. of said compound per 5 cc. of said suspension or solution.

8. The composition of claim 1 in suppository form.

9. The composition of claim 8 wherein each said suppository comprises about 5 mg. of said compound.

10. A method of preventing or inhibiting aggressive behavior in an animal subject, said method comprising administering to an animal subject characterized by the exhibition of aggressive behavior a therapeutically effective amount of the base, 2-(3 - benzo[b]thenyl)-2-thiopseudourea, or a pharmaceutically acceptable salt thereof.

11. The method of claim 10 wherein said compound is administered to said animal in an orally administrable dosage form.

12. The method of claim 11 wherein said orally administrable dosage form is a pill, tablet or capsule.

13. The method of claim 11 wherein said orally administrable dosage form is a suspension or solution.

14. The method of claim 10 wherein said compound is administered to said animal in parenteral dosage form.

15. The method of claim 10 wherein said compound is administered to said animal in rectally administrable dosage form.

16. The method of claim 15 wherein said rectally administrable dosage form is a suppository.

17. The method of claim 10 wherein said therapeutically effective amount is from about 1 to about 50 mg./kg. of body weight of said animal per day.

18. The method of claim 17 wherein said amount is from about 2 to about 8 mg./kg. of body weight per day.

References Cited

UNITED STATES PATENTS 3,186,990   6/1965   Lambrech et al. _____ 260—251

OTHER REFERENCES

Cagniant, C. R., Acad. Sci. Ser. C. 1970, 271 (17), 1086–1089 (Oct. 28, 1970).

STANLEY J. FRIEDMAN, Primary Examiner

PO-1050
(5/69)

UNITED STATES PATENT OFFICE
CERTIFICATE OF CORRECTION

Patent No. 3,839,578        Dated October 1, 1974

Inventor(s) Zaven S. Ariyan et al.

It is certified that error appears in the above-identified patent and that said Letters Patent are hereby corrected as shown below:

Column 1, line 7: After inventors' names and addresses, insert --, assignors to Uniroyal, Inc., New York, N.Y.--

Signed and sealed this 18th day of February 1975.

(SEAL)
Attest:

RUTH C. MASON
Attesting Officer

C. MARSHALL DANN
Commissioner of Patents
and Trademarks